United States Patent
Sivanadyan et al.

(10) Patent No.: US 9,609,598 B2
(45) Date of Patent: Mar. 28, 2017

(54) POWER CONTROL PERFORMANCE FOR USER EQUIPMENT

(71) Applicant: QUALCOMM Incorporated, San Diego, CA (US)

(72) Inventors: Thiagarajan Sivanadyan, Boulder, CO (US); Prasad Kadiri, San Diego, CA (US); Neelakanta Venkata Seshachalam Chimmapudi, San Diego, CA (US); Ammar Kitabi, San Diego, CA (US); Kamalakar Ganti, San Diego, CA (US); Chintan Shah, San Diego, CA (US); Aziz Gholmieh, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/814,321

(22) Filed: Jul. 30, 2015

(65) Prior Publication Data

US 2016/0037453 A1 Feb. 4, 2016

Related U.S. Application Data

(60) Provisional application No. 62/031,160, filed on Jul. 31, 2014.

(51) Int. Cl.
*G08C 17/00* (2006.01)
*H04W 52/02* (2009.01)
(Continued)

(52) U.S. Cl.
CPC ....... *H04W 52/0235* (2013.01); *H04L 1/1812* (2013.01); *H04L 5/0055* (2013.01);
(Continued)

(58) Field of Classification Search
CPC ............. H04W 52/0235; H04W 52/44; H04W 52/146; H04W 52/48; H04L 1/1812; H04L 5/0055; Y02B 60/50
See application file for complete search history.

(56) References Cited

U.S. PATENT DOCUMENTS

| | | | | |
|---|---|---|---|---|
| 2001/0004374 A1* | 6/2001 | Kono | ......... | H04W 52/362 |
| | | | | 375/130 |
| 2006/0046765 A1* | 3/2006 | Kogure | ......... | H04W 52/28 |
| | | | | 455/522 |

(Continued)

FOREIGN PATENT DOCUMENTS

| | | |
|---|---|---|
| EP | 0994576 A2 | 4/2000 |
| WO | 2008052201 A2 | 5/2008 |

(Continued)

OTHER PUBLICATIONS

International Search Report and Written Opinion—PCT/US2015/043130—ISA/EPO—Oct. 7, 2015.

*Primary Examiner* — Clemence Han
(74) *Attorney, Agent, or Firm* — Arent Fox LLP

(57) ABSTRACT

A method, an apparatus, and a computer program product for wireless communication are provided. The apparatus configured to establish a wireless connection to a first network, tune away from the first network for a first predetermined interval, tune back to the first network after the first predetermined interval, enter a power control freeze state for a second predetermined interval after tuning back to the first network, send a plurality of transmissions to the first network during the second predetermined interval, determine if a number of the plurality of transmissions that are not received by the first network exceeds a first threshold or if a number of the plurality of transmissions that are retransmitted to the first network exceeds a second threshold, and exit the power control freeze state when it is determined that the first threshold is exceeded or when it is determined that the second threshold is exceeded.

26 Claims, 10 Drawing Sheets

(51) Int. Cl.
  *H04L 1/18* (2006.01)
  *H04L 5/00* (2006.01)
  *H04W 52/44* (2009.01)
  *H04W 52/14* (2009.01)
  *H04W 52/48* (2009.01)

(52) U.S. Cl.
  CPC .......... *H04W 52/44* (2013.01); *H04W 52/146* (2013.01); *H04W 52/48* (2013.01); *Y02B 60/50* (2013.01)

(56) References Cited

U.S. PATENT DOCUMENTS

| | | | |
|---|---|---|---|
| 2007/0049272 A1* | 3/2007 | Alberth | H04W 72/005 455/435.1 |
| 2009/0010229 A1* | 1/2009 | Kazmi | H04W 52/243 370/336 |
| 2009/0286576 A1* | 11/2009 | Lee | H04W 52/287 455/574 |
| 2012/0008510 A1 | 1/2012 | Cai et al. | |
| 2012/0071103 A1* | 3/2012 | Kadous | H04W 72/1215 455/63.1 |
| 2012/0294173 A1 | 11/2012 | Su et al. | |
| 2013/0114436 A1 | 5/2013 | Dural et al. | |
| 2013/0337861 A1* | 12/2013 | Bhogaraju | H04W 52/10 455/522 |
| 2015/0257199 A1* | 9/2015 | Su | H04W 52/0232 455/552.1 |
| 2015/0358942 A1* | 12/2015 | Uzunoglu | H04W 72/02 370/328 |

FOREIGN PATENT DOCUMENTS

| | | |
|---|---|---|
| WO | 2011020489 A1 | 2/2011 |
| WO | 2014114273 A1 | 7/2014 |

* cited by examiner

POWER CONTROL PERFORMANCE FOR USER EQUIPMENT

CROSS-REFERENCE TO RELATED APPLICATION(S)

This application claims the benefit of U.S. Provisional Application Ser. No. 62/031,160, entitled "POWER CONTROL PERFORMANCE FOR USER EQUIPMENT" and filed on Jul. 31, 2014, which is expressly incorporated by reference herein in its entirety.

BACKGROUND

Field

The present disclosure relates generally to communication systems, and more particularly, but not exclusively to optimizing power control performance for single radio hybrid tune away devices.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

A method, an apparatus, and a computer program product for wireless communication are provided. The apparatus configured to establish a wireless connection to a first network, tune away from the first network for a first predetermined interval, tune back to the first network after the first predetermined interval, enter a power control freeze state for a second predetermined interval after tuning back to the first network, send a plurality of transmissions to the first network during the second predetermined interval, determine if a number of the plurality of transmissions that are not received by the first network exceeds a first threshold or if a number of the plurality of transmissions that are retransmitted to the first network exceeds a second threshold, and exit the power control freeze state when it is determined that the first threshold is exceeded or when it is determined that the second threshold is exceeded.

DETAILED DESCRIPTION

Figure 1:
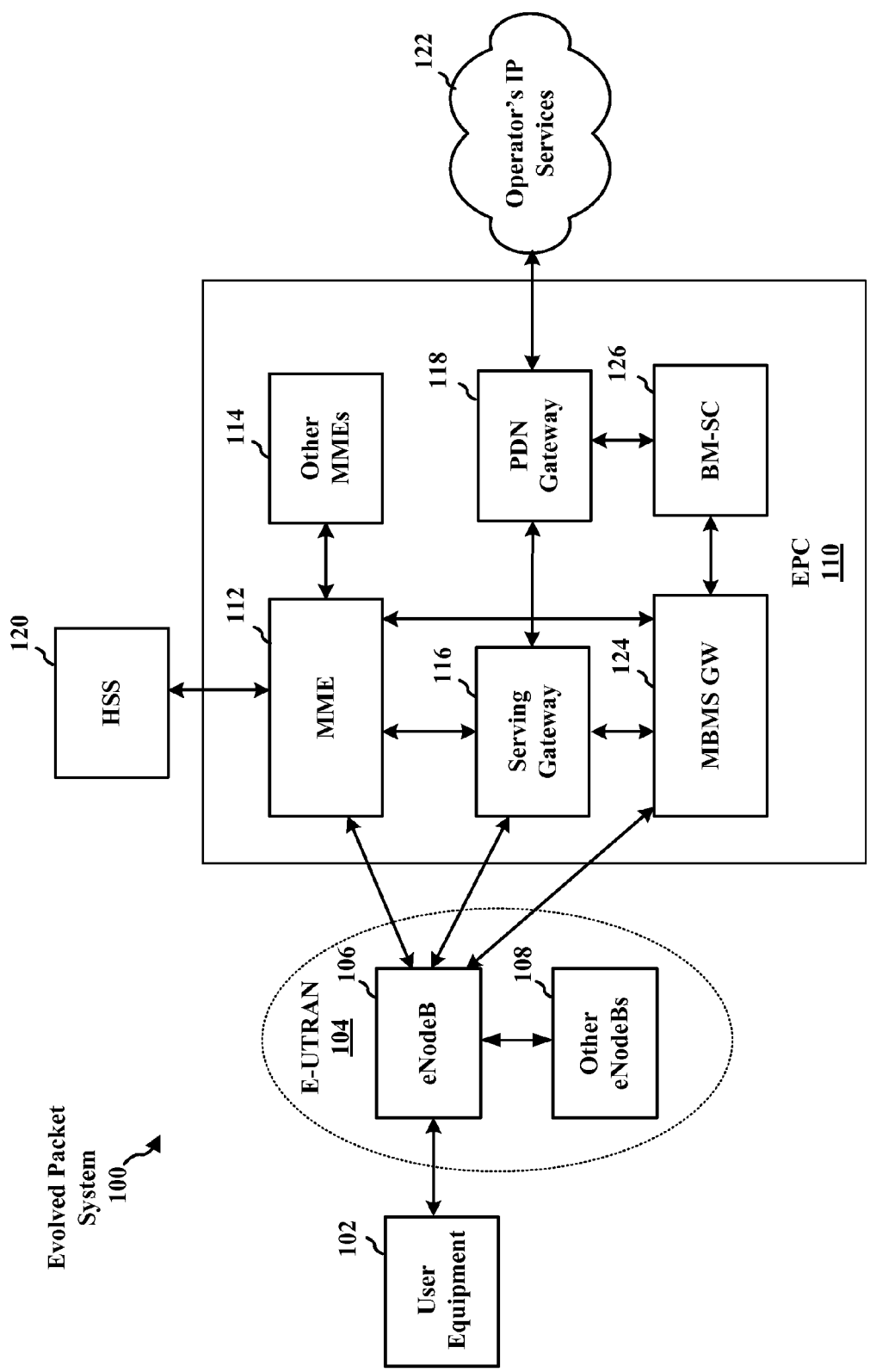
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
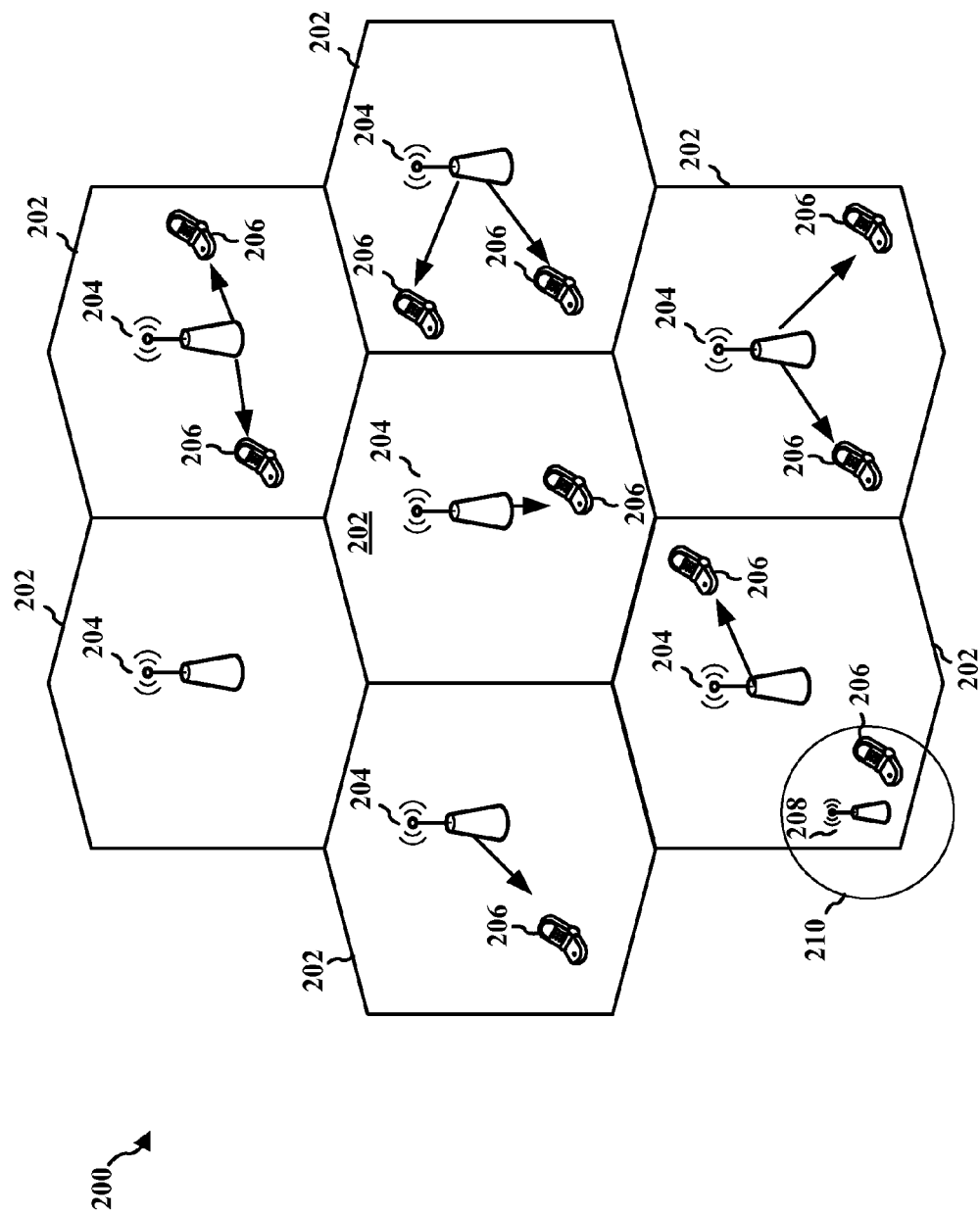
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
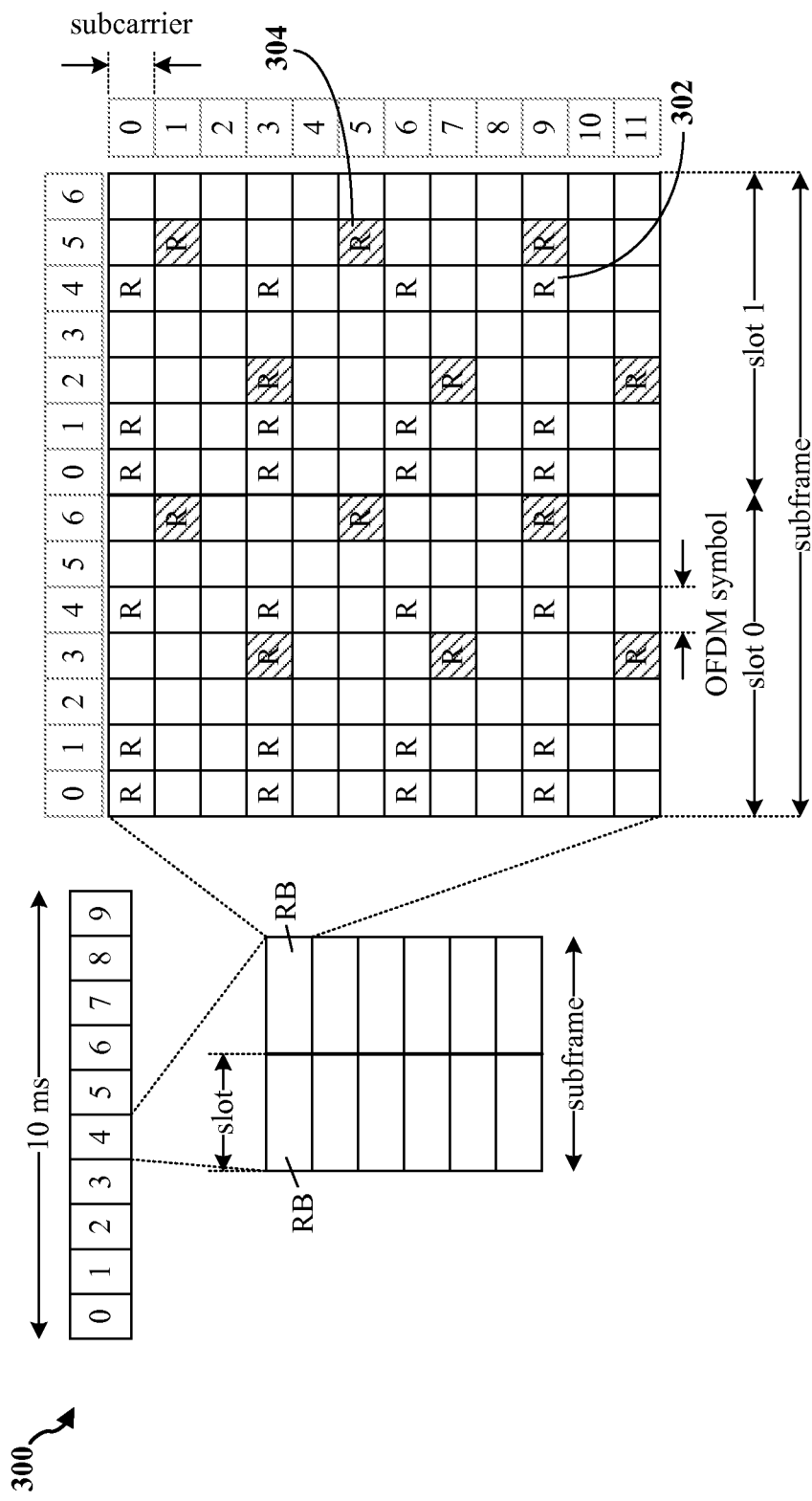
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
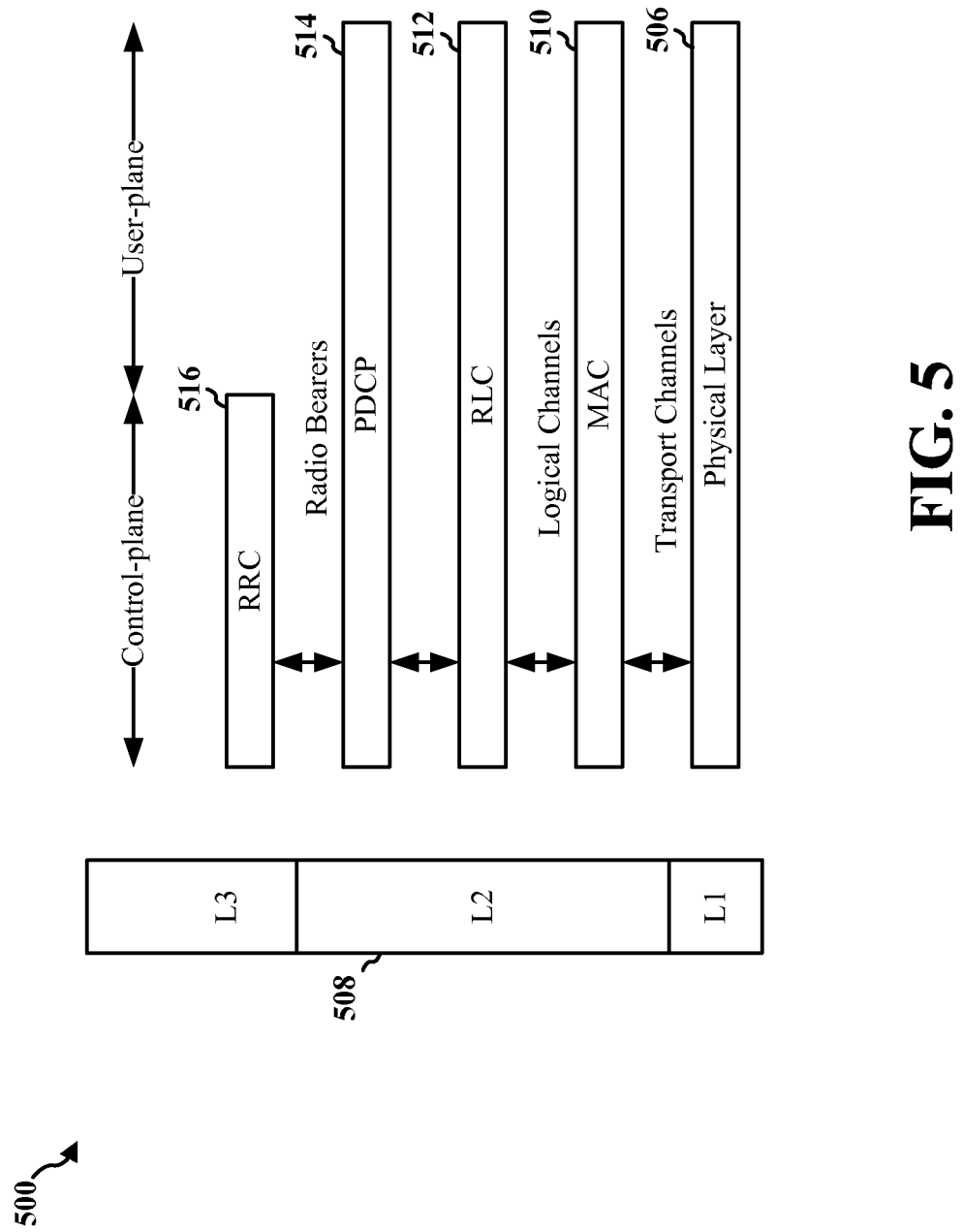
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
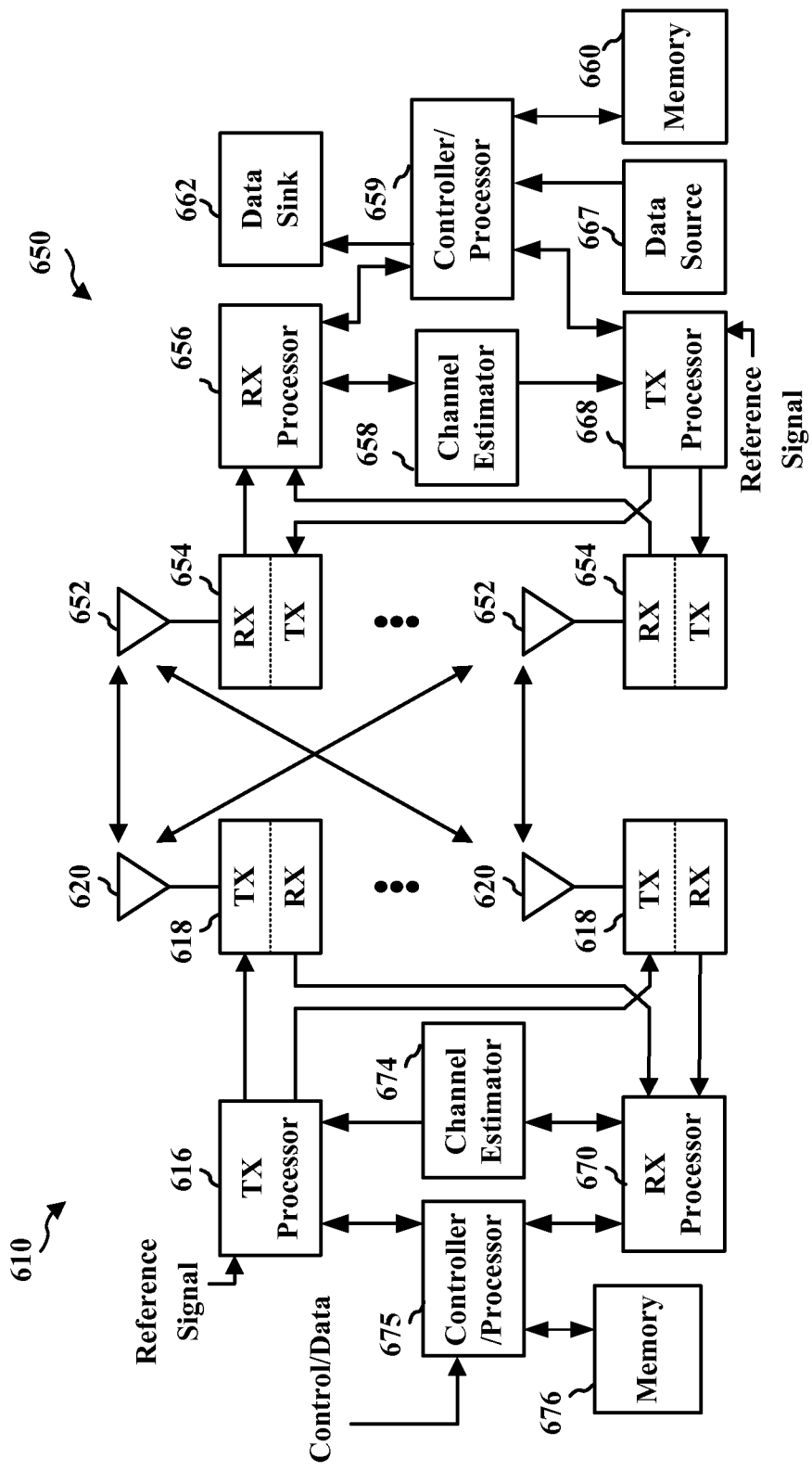
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
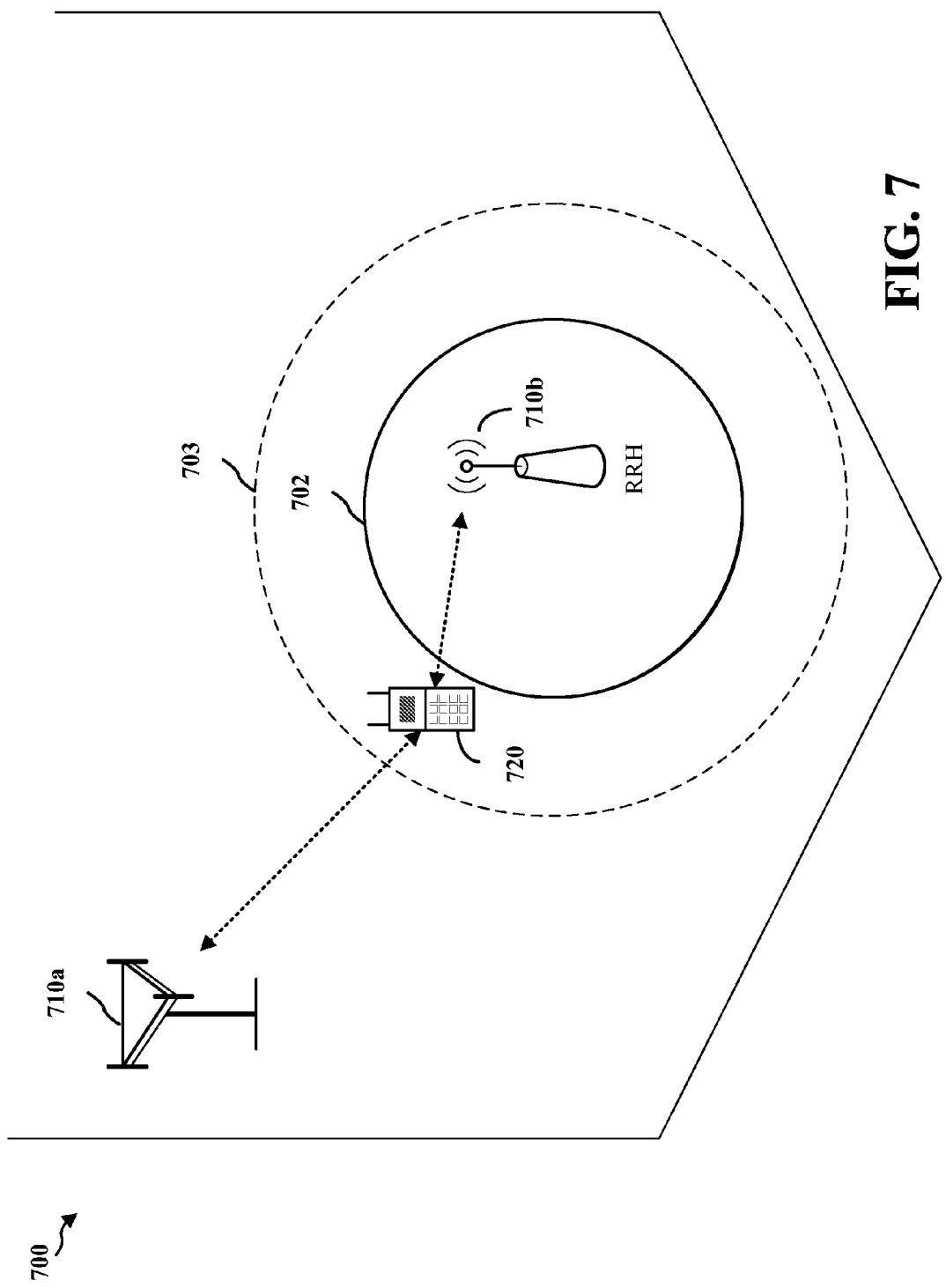
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710b may have a range expanded cellular region 703 that is expanded from the cellular region 702 through enhanced inter-cell interference coordination between the RRH 710b and the macro eNB 710a and through interference cancellation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

A user equipment (UE) connected to an LTE network may periodically want to tune away to another network to periodically monitor other legacy voice service technologies for incoming pages and/or overhead message updates. Furthermore, the UE may want to tune away to another network to see if a better connection is available.

For example, an LTE single radio hybrid tune away user equipment (UE) can tune away from an LTE network to other networks such as 1×RTT, GSM, TD-SCDMA, or other 3G technologies to determine if a page has been received from the other network. LTE uplink (UL) channels PUCCH, PUSCH, and SRS can be power controlled by a combination of both open loop control procedure and closed loop control bits received from PDCCH downlink (DL) and UL grants received by the UE from an LTE e-Node B. LTE can support both cumulative and absolute power control procedures. A UE specific PUSCH channel power control bits can be received by the UE from PDCCH DCI 0 uplink grants. During LTE UL data transfer, when the UE is tuned away to the second network, the UE can miss all PDCCH DCI 0 grants and associated PUSCH power control bits. Because the UE has missed all PDCCH DCI 0 grants during the turn away period, certain LTE e-Node Bs can continue to send UL PUSCH grants with increased cumulative power control bits. Once the UE tunes back to the LTE network and receives the PDCCH DCI 0 grants, the UE will start transmitting PUSCH data with transmit (Tx) power higher than the Tx power used prior to the tuning away period. Due to high UE Tx power after tuning back to the LTE network, the UE can experience an increase in power consumption, UL block error rate (BLER), lower power headroom (PHR) value reported by the UE and can cause e-Node B scheduler to reduce UL data rate scheduling via UL resource blocks (RBs), modulation and coding scheme (MCS), and/or TB size. Furthermore, high UE Tx power can cause an increased inter-cell UL interference and impact overall LTE system UL performance.

Figure 8:
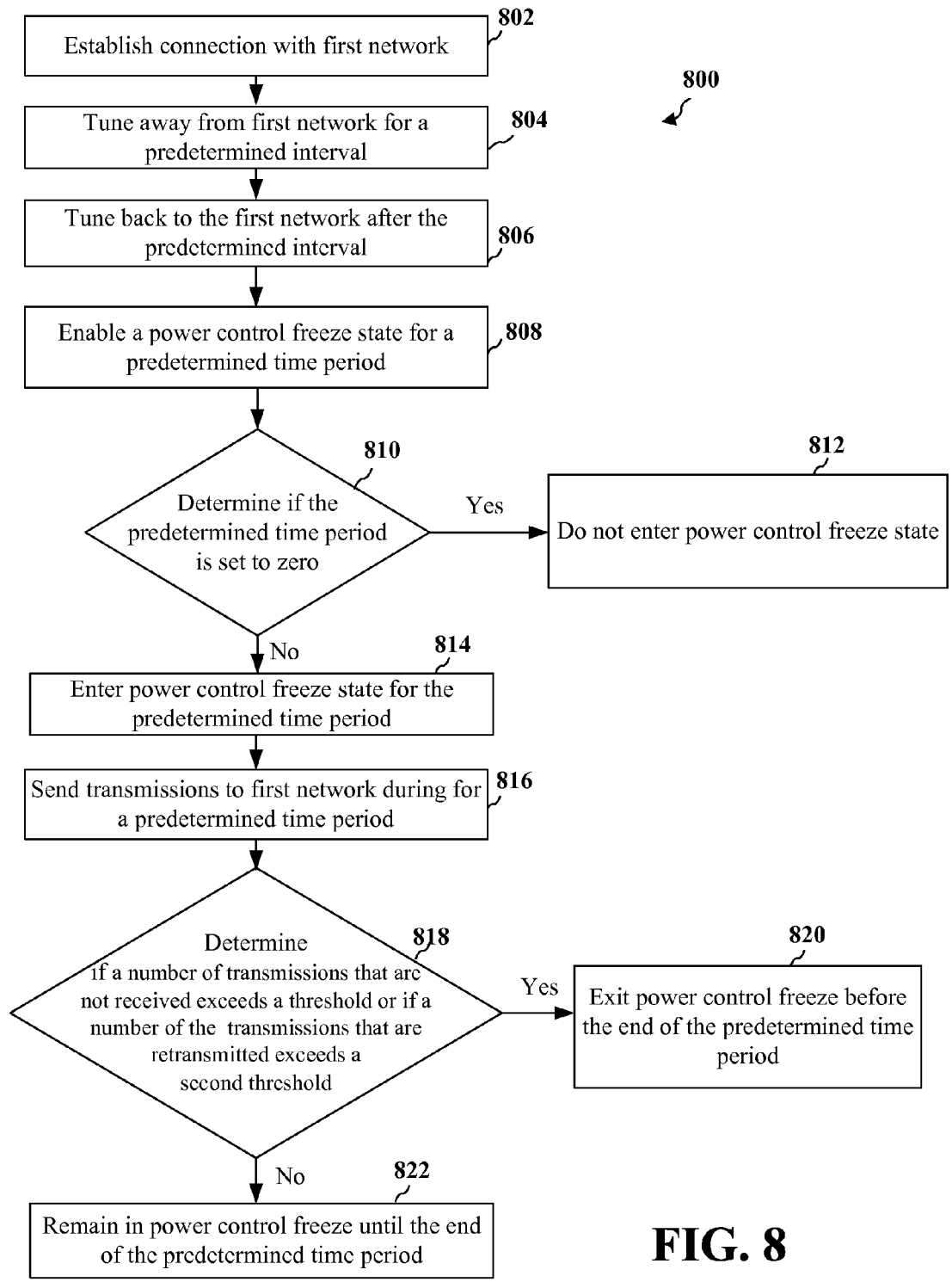
FIG. 8 is a flow chart of a method of wireless communication.

FIG. 8 illustrates a flow chart 800 of a method of wireless communication in accordance with various aspects. The method may be performed by a UE, such as UE 102.

In step 802, the UE establishes a connection to a first network. For example, the first network may be an LTE network, a 1×RTT network, a TD-SCDMA network, an UTRA network, a GSM network Global System for Mobile Communications (GSM) employing TDMA, an E-UTRA network, an IEEE 802.11 (Wi-Fi) network, an IEEE 802.16 (WiMAX) network, an IEEE 802.20 network, or a Flash-OFDM network.

In step 804, the UE enables a tune away protocol such that at predetermined time periods the UE tunes away from the first network to determine if a page has been received by a second network. For example, the second network can include an LTE network, a 1×RTT network, a TD-SCDMA network, an UTRA network, a GSM network Global System for Mobile Communications (GSM) employing TDMA, an E-UTRA network, an IEEE 802.11 (Wi-Fi) network, and IEEE 802.16 (WiMAX) network, an IEEE 802.20 network, or a Flash-OFDM network.

In step 806, the UE tunes back to the first network after the predetermined time period. For example, the UE can tune back to the LTE network, the 1×RTT network, the TD-SCDMA network, an UTRA network, the GSM network Global System for Mobile Communications (GSM) employing TDMA, the E-UTRA network, the IEEE 802.11 (Wi-Fi) network, the IEEE 802.16 (WiMAX) network, an IEEE 802.20 network, or the Flash-OFDM network after the predetermined time period.

In step 808, the UE enables a power control freeze state for a predetermined time period. For example, the UE can freeze PUSCH closed loop power control operation for transmission power control (TPC) power up commands received from the first network for a predetermined freeze period after tuning back to the first network.

In step 810, the UE can determine if the predetermined time period is configured to be zero. Based on a positive result at step 810, in step 812, the UE may not enter the power control freeze state. For example, the UE does not freeze the PUSCH closed loop power control operation for TPC power up commands after tuning back to the first network. Based on a negative result at step 810, in step 814, the UE enters the power control freeze state for the predetermined freeze period. For example, a default predetermined freeze period can be set to 50 ms, such that for the 50 ms following tuning back to the first network, the UE will not transmit at a higher Tx power regardless of UL PUSCH grants/commands received from the first network when the UE tunes back to the first network.

At step 816, the UE sends a plurality of transmissions to the first network while in the power control freeze state. For example, the UE can send a plurality of UL transmission to the first network using a HARQ process.

At step 818, the UE determines if a number of the plurality of transmissions that are not received by the first network exceeds a threshold or if a number of the plurality of transmissions that are retransmitted to the first network exceeds a second threshold. In an aspect, the UE can determine if the number of negative acknowledgements (NAKs) received from the first network during the power control freeze state exceeds a predetermined number (e.g., the first threshold). For example, the first threshold can be equal to Max(2,(maxHARQ_Tx−2)). In this example, 3 transmissions would need to not be received before the UE exits the power control freeze state until a subsequent power control freeze state. The value "2" in the equation can be configured based on UE software configuration parameters. The UE can also determine if the number of retransmissions (maxHARQ-Tx) exceeds a second threshold. If it is determined at step 818 that that the number of transmissions not received exceeds the first threshold and/or that the number of retransmissions exceeds the second threshold, at step 820 the UE can exit the power freeze state prior to the end of the predetermined time period until a subsequent power control freeze state.

Based on a negative result at step 818 (e.g., the UE determines at step 818 that the number of NAKs received from the first network does not exceed the first threshold and that the number of retransmissions does not exceed the second threshold), then at step 820 the UE can remain in the power control freeze state until the end of the predetermined time period.

Figure 9:
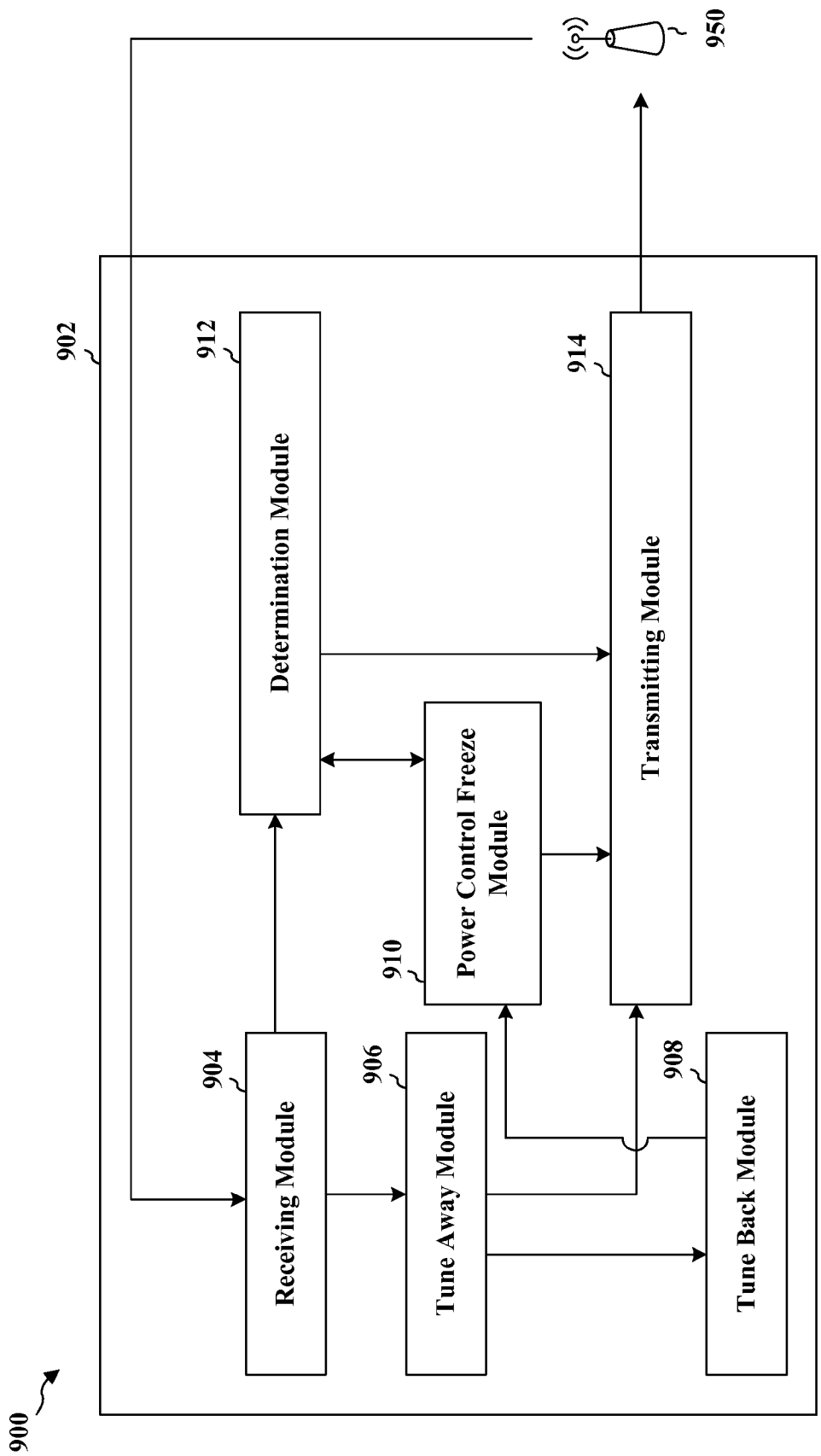
FIG. 9 is a conceptual data flow diagram illustrating the data flow between different modules/means/components in an exemplary apparatus.

FIG. 9 is a conceptual data flow diagram 900 illustrating the data flow between different modules/means/components in an exemplary apparatus 902 that can communicate with a base station 950. The apparatus 902 may be, for example, a UE. IN an aspect the base station 950 can be a part of a first network and/or a second network. The apparatus 902 can include a receiving module 904 that receives pages or data from the first and/or second network, a tune away module 906 that tunes away from the first network, a tune back module 908 that tunes back to the first network, a power control freeze module 910 that enters and exits a power control freeze state, a determination module 912, and a transmitting module 914 that transmits data.

The receiving module 904 establishes a connection to a first network and/or second network. For example, the first network and/or second network may be an LTE network, a 1×RTT network, a TD-SCDMA network, an UTRA network, a GSM network Global System for Mobile Communications (GSM) employing TDMA, an E-UTRA network, an IEEE 802.11 (Wi-Fi) network, and IEEE 802.16 (WiMAX) network, an IEEE 802.20 network, or Flash-OFDM network. The receiving module 904 can receive pages or data from a first and/or second network. For example, the receiving module 904 can receive pages or data from the base station 950.

The tune away module 906 enables a tune away protocol such that at predetermined time periods the UE 902 tunes away from the first network to determine if a page has been received by a second network. For example, the second network can include an LTE network, a 1×RTT network, a TD-SCDMA network, an UTRA network, a GSM network Global System for Mobile Communications (GSM) employing TDMA, an E-UTRA network, an IEEE 802.11 (Wi-Fi) network, and IEEE 802.16 (WiMAX) network, an IEEE 802.20 network, or Flash-OFDM network. The receiving module 904 can receive pages or data from a first and/or second network. For example, the receiving module 904 can receive pages or data from the base station 950.

The tune back module 908 tunes back to the first network after the predetermined time period. For example, the UE 902 can tune back to the LTE network, the 1×RTT network, the TD-SCDMA network, an UTRA network, the GSM network Global System for Mobile Communications (GSM) employing TDMA, the E-UTRA network, the IEEE 802.11 (Wi-Fi) network, the IEEE 802.16 (WiMAX) network, an IEEE 802.20 network, or the Flash-OFDM network after the predetermined time period.

The power control freeze module 910 enables a power control freeze state for a predetermined time period. For example, the power control freeze module 912 can freeze a PUSCH closed loop power control operation for transmission power control (TPC) power up commands received by the receiving module 904 from the first network for a predetermined freeze period after the tune back module 908 tunes back to the first network.

The determination module 912 can determine if the predetermined time period is configured to be zero. Based on a positive result, the determination module 910 can send a signal instructing the power control freeze module 910 not enter the power control freeze state. For example, power control freeze module 910 does not freeze the PUSCH closed loop power control operation for TPC power up commands after tuning back to the first network if the predetermined time period is set to zero. Based on a negative result, the determination module 912 can send a signal instructing the power control freeze module 910 to enter the power control freeze state for the predetermined freeze period. For example, a default predetermined freeze period can be set to 50 ms, such that for the 50 ms following tuning back to the first network, the UE 902 will not transmit at a higher Tx power regardless of UL PUSCH grants/commands received by the receiving module 904 from the first network when the tune back module 908 tunes back to the first network.

The transmitting module 914 can send a plurality of transmissions to the first network while the UE 902 is in the power control freeze state. For example, the transmitting module 914 can send a plurality of UL transmission to the first network using a HARQ process during the predetermined freeze period.

The determination module 912 can determine if a number of the plurality of transmissions (e.g., transmitted by the transmitting module 914 during the predetermined freeze period) that are not received by the first network by exceeds a threshold or if a number of the plurality of transmissions that are retransmitted to the first network exceeds a second threshold. In an aspect, the determination module 912 can determine if the number of negative acknowledgements (NAKs) received by the receiving module 904 from the first network during the power control freeze state exceeds a predetermined number. For example, the first threshold can be equal to Max(2,(maxHARQ_Tx−2)). In this example, 3 transmissions would need to not be received before the determination module 912 sends a signal instructing the power control freeze module 910 to exit the power control freeze state until a subsequent power control freeze state. The value "2" in the equation can be configured based on UE software configuration parameters. The determination module 912 can also determine if the number of retransmissions (maxHARQ−Tx) exceeds a second threshold. If the determination module 912 determines that the number of retransmissions exceeds the threshold, then the determination module 912 can send a signal instructing the power control freeze module 910 to exit the power freeze state prior to the end of the predetermined time period until a subsequent power control freeze state.

However, if the determination module 912 determines that the number of NAKs received from the first network during the predetermined freeze period does not exceed the first threshold and that the number of retransmissions by the transmitting module 912 during the predetermined freeze period does not exceed the second threshold, then the power control freeze module 910 can remain in the power control freeze state until the end of the predetermined time period.

The apparatus may include additional modules that perform each of the steps of the algorithm in the aforementioned flow chart of FIG. 8. As such, each step in the aforementioned flow chart of FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 10:
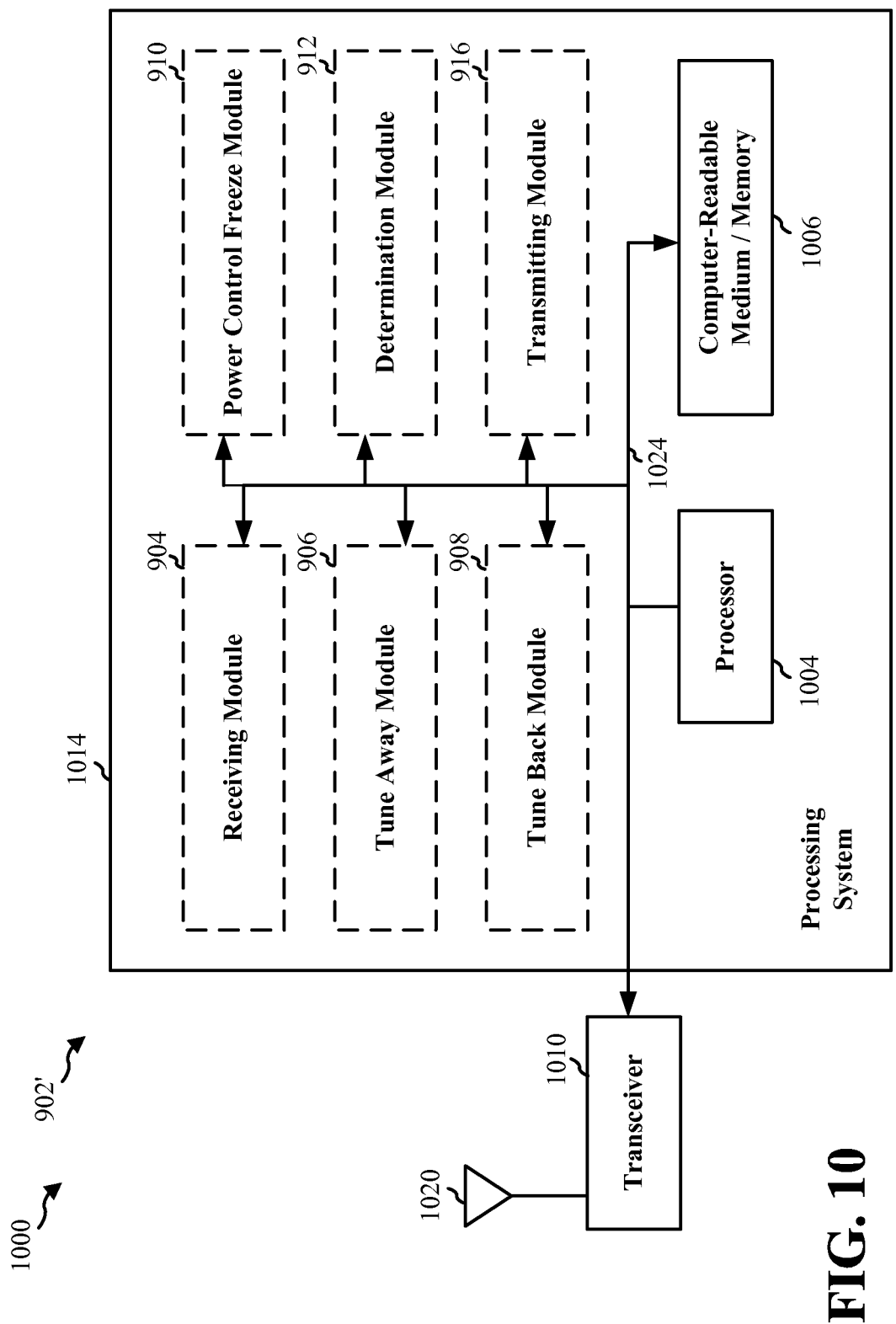
FIG. 10 is a diagram illustrating an example of a hardware implementation for an apparatus 902' employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, the modules 904, 906, 908, 910, 912, 914 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the receiving module 904. In addition, the transceiver 1010 receives information from the processing system 1014, specifically the transmitting module 916, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system further includes at least one of the modules 904, 906, 908, 910, 912, 914, 916. The modules may be software modules running in the processor 1004, resident/stored in the computer readable medium/memory 1006, one or more hardware modules coupled to the processor 1004, or some combination thereof. The processing system 1014 may be a component of the base station 105 and may include the memory 676 and/or at least one of the TX processor 616, the RX processor 670, and the controller/processor 675. The processing system 1014 may alternatively be a component of the UE 102 and may include the memory 660 and/or at least one of the TX processor 668, the RX processor 656, and the controller/processor 659.

In one configuration, the apparatus 902/902' for wireless communication includes means for establishing a wireless connection to a first network; means for tuning away from the first network for a first predetermined interval; means for tuning back to the first network after the first predetermined interval; means for entering a power control freeze state for a second predetermined interval after tuning back to the first network; wherein the means for entering the power control freeze state comprises means for disabling an increase of a transmission power means for sending a plurality of transmissions to the first network during the second predetermined interval; means for determining if a number of the plurality of transmissions that are not received by the first network exceeds a first threshold or if a number of the plurality of transmissions that are retransmitted to the first network exceeds a second threshold; means for exiting the power control freeze state when it is determined that the first threshold is exceeded or when it is determined that the second threshold is exceeded; means for receiving at least one power control command from the first network after tuning back to the first network; wherein the at least one power control command includes a command to increase a transmission power; wherein the means for entering the power control freeze state comprises means for ignoring the command to increase the transmission power; wherein the at least one power control command includes a command to decrease a transmission power; means for decreasing the transmission power during the second predetermined interval; means for exiting the transmission power control freeze state at the end of the second predetermined interval if the first threshold and the second threshold are not exceeded before an end of the second predetermined interval, wherein the means for exiting the transmission power control freeze state comprises means for enabling an increase of the transmission power; wherein the means for sending the plurality of transmissions to the first network comprises means for a HARQ process; and wherein the means for determining if the number of the plurality of transmissions that are not received by the first network exceeds the first threshold or if the number of the plurality of transmissions that are retransmitted to the first network exceeds the second threshold comprises means for determining a number of negative acknowledgements (NAKs) received from the first network.

The aforementioned means may be one or more of the aforementioned modules of the apparatus 902 and/or the processing system 1014 of the apparatus 902' configured to perform the functions recited by the aforementioned means. As described supra, the processing system 1014 may include the TX Processor 668, the RX Processor 656, and the controller/processor 659. As such, in one configuration, the aforementioned means may be the TX Processor 616, the RX Processor 670, and the controller/processor 675 configured to perform the functions recited by the aforementioned means. Alternatively, as described supra, the processing system 1014 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

The apparatus may include additional modules that perform each of the steps of the algorithm in the aforementioned flow chart of FIG. 8. As such, each step in the aforementioned flow chart of FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of power control for a user equipment (UE), comprising:
   establishing a wireless connection to a first network;
   tuning away from the first network for a first predetermined interval;
   tuning back to the first network after the first predetermined interval;
   entering a power control freeze state for a second predetermined interval after tuning back to the first network; and
   sending a plurality of transmissions to the first network during the second predetermined.

2. The method of claim 1, further comprising receiving at least one power control command from the first network after tuning back to the first network.

3. The method of claim 2, wherein the at least one power control command includes a command to increase a transmission power.

4. The method of claim 1, further comprising:
   determining if a number of the plurality of transmissions that are not received by the first network exceeds a first threshold or if a number of the plurality of transmissions that are retransmitted to the first network exceeds a second threshold; and
   exiting the power control freeze state when it is determined that the first threshold is exceeded or when it is determined that the second threshold is exceeded.

5. The method of claim 4, further comprising exiting the transmission power control freeze state at the end of the second predetermined interval if the first threshold and the second threshold are not exceeded before an end of the second predetermined interval, wherein exiting the transmission power control freeze state includes enabling an increase of the transmission power.

6. The method of claim 4, wherein:
   the sending the plurality of transmissions to the first network comprises a HARQ process; and
   the determining if the number of the plurality of transmissions that are not received by the first network exceeds the first threshold or if the number of the plurality of transmissions that are retransmitted to the first network exceeds the second threshold comprises determining a number of negative acknowledgements (NAKs) received from the first network.

7. A method of power control for a user equipment (UE), comprising:
   establishing a wireless connection to a first network;
   tuning away from the first network for a first predetermined interval;
   tuning back to the first network after the first predetermined interval;
   disabling an increase of a transmission power for a second predetermined interval after tuning back to the first network; and
   sending a plurality of transmissions to the first network during the second predetermined interval.

8. The method of claim 7, further comprising:
   determining if a number of the plurality of transmissions that are not received by the first network exceeds a first threshold or if a number of the plurality of transmissions that are retransmitted to the first network exceeds a second threshold; and
   enabling an increase of the transmission power when it is determined that the first threshold is exceeded or when it is determined that the second threshold is exceeded.

9. A method of power control for a user equipment (UE), comprising:
   establishing a wireless connection to a first network;
   tuning away from the first network for a first predetermined interval;
   tuning back to the first network after the first predetermined interval;
   receiving at least one power control command from the first network after tuning back to the first network;
   refraining from increasing the transmission power in response to the at least one power control command to increase the transmission power for a second predetermined interval after tuning back to the first network; and
   sending a plurality of transmissions to the first network during the second predetermined interval.

10. The method of claim 9, wherein the at least one power control command includes a command to decrease a transmission power.

11. The method of claim 10, further comprising decreasing the transmission power during the second predetermined interval.

12. The method of claim 9, further comprising:
    determining if a number of the plurality of transmissions that are not received by the first network exceeds a first threshold or if a number of the plurality of transmissions that are retransmitted to the first network exceeds a second threshold; and
    enabling an increase of the transmission power when it is determined that the first threshold is exceeded or when it is determined that the second threshold is exceeded.

13. An apparatus for wireless communication, comprising:
    means for establishing a wireless connection to a first network;
    means for tuning away from the first network for a first predetermined interval;
    means for tuning back to the first network after the first predetermined interval;
    means for entering a power control freeze state for a second predetermined interval after tuning back to the first network; and means for sending a plurality of transmissions to the first network during the second predetermined interval.

14. The apparatus of claim 13, further comprising means for receiving at least one power control command from the first network after tuning back to the first network.

15. The apparatus of claim 14, wherein the at least one power control command includes a command to increase the transmission power.

16. The apparatus of claim 14, wherein the at least one power control command includes a command to decrease the transmission power.

17. The apparatus of claim 13, further comprising:
means for determining if a number of the plurality of transmissions that are not received by the first network exceeds a first threshold or if a number of the plurality of transmissions that are retransmitted to the first network exceeds a second threshold;
means for exiting the power control freeze state when it is determined that the first threshold is exceeded or when it is determined that the second threshold is exceeded; and
means for exiting the transmission power control freeze state at the end of the second predetermined interval if the first threshold and the second threshold are not exceeded before an end of the second predetermined interval, wherein the means for exiting the transmission power control freeze state comprises means for enabling an increase of the transmission power.

18. The apparatus of claim 13, further comprising:
means for determining if a number of the plurality of transmissions that are not received by the first network exceeds a first threshold or if a number of the plurality of transmissions that are retransmitted to the first network exceeds a second threshold;
means for exiting the power control freeze state when it is determined that the first threshold is exceeded or when it is determined that the second threshold is exceeded,
wherein the means for sending the plurality of transmissions to the first network comprises means for a HARQ process; and
the means for determining if the number of the plurality of transmissions that are not received by the first network exceeds the first threshold or if the number of the plurality of transmissions that are retransmitted to the first network exceeds the second threshold comprises means for determining a number of negative acknowledgements (NAKs) received from the first network.

19. An apparatus for wireless communication, comprising:
a memory; and
at least one processor coupled to the memory and configured to:
establish a wireless connection to a first network;
tune away from the first network for a first predetermined interval;
tune back to the first network after the first predetermined interval;
enter a power control freeze state for a second predetermined interval after tuning back to the first network; and
send a plurality of transmissions to the first network during the second predetermined interval.

20. The apparatus of claim 19, wherein the at least one processor is further configured to receive at least one power control command from the first network after tuning back to the first network, wherein the at least one power control command includes a command to increase a transmission power.

21. The apparatus of claim 19, wherein the at least one processor is further configured to:
determine if a number of the plurality of transmissions that are not received by the first network exceeds a first threshold or if a number of the plurality of transmissions that are retransmitted to the first network exceeds a second threshold;
exit the power control freeze state when it is determined that the first threshold is exceeded or when it is determined that the second threshold is exceeded; and
exit the transmission power control freeze state at the end of the second predetermined interval if the first threshold and the second threshold are not exceeded before an end of the second predetermined interval, wherein the at least one processor is configured to exit the transmission power control freeze state by enabling an increase of the transmission power.

22. The apparatus of claim 19, wherein the at least one processor is configured to:
determine if a number of the plurality of transmissions that are not received by the first network exceeds a first threshold or if a number of the plurality of transmissions that are retransmitted to the first network exceeds a second threshold;
exit the power control freeze state when it is determined that the first threshold is exceeded or when it is determined that the second threshold is exceeded;
send the plurality of transmissions to the first network using a HARQ process; and
determine if the number of the plurality of transmissions that are not received by the first network exceeds the first threshold or if a number of the plurality of transmission that are retransmitted to the first network exceeds the second threshold by determining a number of negative acknowledgements (NAKs) received from the first network.

23. A non-transitory computer-readable medium storing executable code for wireless communication, comprising code for:
establishing a wireless connection to a first network;
tuning away from the first network for a first predetermined interval;
tuning back to the first network after the first predetermined interval;
entering a power control freeze state for a second predetermined interval after tuning back to the first network; and
sending a plurality of transmissions to the first network during the second predetermined interval.

24. The computer-readable medium of claim 23, further comprising code for receiving at least one power control command from the first network after tuning back to the first network, wherein the at least one power control command includes a command to increase a transmission power.

25. The computer-readable medium of claim 23, further comprising code for:
determining if a number of the plurality of transmissions that are not received by the first network exceeds a first threshold or if a number of the plurality of transmissions that are retransmitted to the first network exceeds a second threshold;
exiting the power control freeze state when it is determined that the first threshold is exceeded or when it is determined that the second threshold is exceeded; and exiting the transmission power control freeze state at the end of the second predetermined interval if the first threshold and the second threshold are not exceeded before the end of the second predetermined interval, wherein the code for exiting the transmission power control freeze state comprises code for enabling an increase of the transmission power.

26. The computer-readable medium of claim 23, wherein the code for:
determining if a number of the plurality of transmissions that are not received by the first network exceeds a first threshold or if a number of the plurality of transmissions that are retransmitted to the first network exceeds a second threshold;
exiting the power control freeze state when it is determined that the first threshold is exceeded or when it is determined that the second threshold is exceeded;
sending the plurality of transmissions to the first network further comprises code for sending the plurality of transmissions using a HARQ process; and
determining if the number of the plurality of transmissions that are not received by the first network exceeds the first threshold or if a number of the plurality of transmissions that are retransmitted to the first network exceeds the second threshold further comprises code for determining a number of NAKs received from the first network.

* * * * *